Dec. 18, 1951     J. A. ASHWORTH ET AL     2,579,289

TEMPERATURE COMPENSATED RESONANT VIBRATING SYSTEM

Filed Nov. 5, 1949

INVENTORS
J. A. ASHWORTH, DECEASED
EVA T. ASHWORTH
HIS ADMINISTRATRIX
L. G. BOSTWICK

BY

ATTORNEY

Patented Dec. 18, 1951

2,579,289

UNITED STATES PATENT OFFICE 2,579,289

TEMPERATURE COMPENSATED RESONANT VIBRATING SYSTEM

Joseph A. Ashworth, deceased, late of Bernardsville, N. J., by Eva T. Ashworth, administratrix, Bernardsville, N. J., and Lee G. Bostwick, Florham Park, N. J., assignors to Bell Telephone Laboratories, Incorporated, New York, N. Y., a corporation of New York Application November 5, 1949, Serial No. 125,754

9 Claims. (Cl. 172—126)

This invention relates to resonant vibrating systems and more particularly to such systems including magnetically driven vibrating reeds.

Vibrating reeds have been found to be well adapted for selectors in mobile radio receivers wherein each selector of a group, for example four in number, has a particular resonance so that all of the reeds in the group will respond to only one combination of four frequencies, and in operating close a circuit through their contacts to actuate a bell or other call indicating device.

In one system thirty-two frequencies, 15 cycles apart in the band from 350 to 850 cycles, are employed, each station having four vibrating reed selectors tuned to one or more of those thirty-two frequencies.

In view of the large number of closely spaced frequencies employed in the above type of system, the tuning of each individual reed must be sharp enough so that it will respond only to its intended frequency. Adjustment of resonance to within 0.5 cycle has been attained in accordance with the construction disclosed in the application of H. C. Harrison, Serial No. 776,252, filed September 26, 1947, now abandoned. These reeds, however, are operated under a wide range of temperatures, upon which the thermoelastic, expansion, and magnetic properties of the materials used and thus the resonance frequency are dependent. It has been found desirable to limit resonance frequency variations to no more than ±.5 cycle over a range of temperatures from —40° F. to 185° F.

One object of this invention is to stabilize the resonance frequency of a vibrating system and more particularly of a magnetically driven vibrating reed.

A further object is to make the use of magnetic materials having favorable magnetic properties but large variations in their thermoelastic and expansion properties with temperature practicable in a magnetically driven resonant system.

In accordance with features of this invention, the polarizing flux of a magnetic driving system for a mechanically resonant vibrating system is varied with temperature to compensate for the thermoelastic and expansion variations of the over-all system. A preferred embodiment for achieving this result includes either a series or parallel element in the magnetic circuit having a flux carrying capacity which changes with temperature in a prescribed manner.

The above-noted and other features of this invention will be understood more clearly and fully from the following detailed description when read in conjunction with the accompanying drawings in which.

Figure 1:
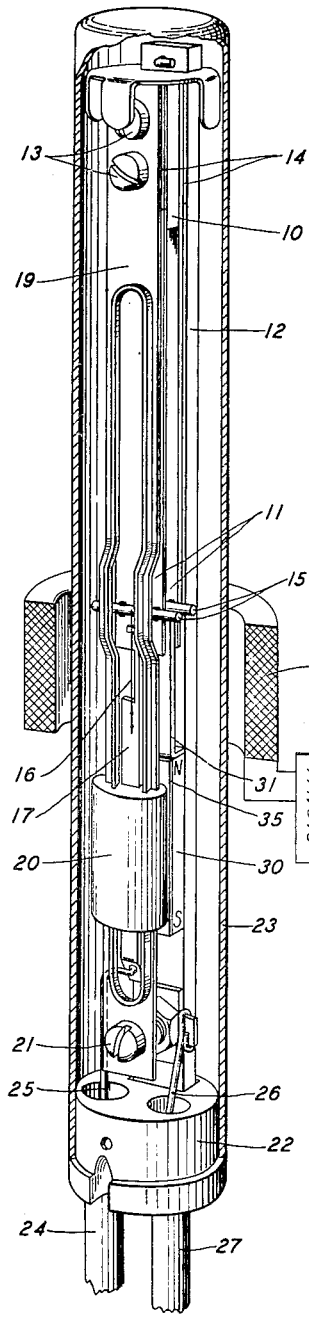
Fig. 1 is a perspective view of a vibrating reed selector employing a shunt embodiment of this invention, portions of the casing and driving coil being broken away to display the elements of the magnetic and vibratory systems.

The resonance frequency of a clamped reed, a tuning fork, or similar vibrating system, changes with temperature primarily because of changes in the elastic modulus of the reed or tines and because of changes in their dimensions. Most metals have a negative thermoelastic coefficient which causes the stiffness of the reed to drop with rising temperature with a consequent tendency to cause the resonance frequency to drop. On the other hand, the expansion coefficient of the material results in an increase in the dimensions of the reed with rising temperature and this dimensional change in turn causes the resonance frequency to rise. It can be shown that if the thermoelastic coefficient and the expansion coefficient are equal in magnitude and opposite in sign, the resonance frequency will not change with temperature.

To obtain this desirable relationship between the thermoelastic and expansion coefficients in a simple reed or tuning fork which may be vibrated mechanically as, say by plucking, use can be made of certain alloys of nickel, iron, chromium and titanium in which the thermoelastic coefficient can be adjusted to the proper value by heat treatment. When so heated, however, it has been found that such materials have magnetic properties which make them unsuitable for use in electromagnetically driven systems. In particular, the permeability of the alloy is low and becomes very small at moderate densities even at elevated room temperatures. If the heat treatment is altered in such a way as to retain satisfactory magnetic characteristics, then the thermoelastic coefficient is not properly related to the expansion coefficient.

To resolve this contradictory situation, it is proposed to use iron or iron alloys heat treated to have adequately uniform and stable magnetic properties and to compensate for the elastic modulus and dimensional variations of such materials by a change in the effective mechanical stiffness of the magnetic flux gap that gives an equal and opposite effect.

In electromagnetic devices having variable magnetic flux gaps and steady polarizing fluxes, the effect of the magnetic flux is to reduce the effective stiffness of the moving mechanical system and therefore to be equivalent to a negative mechanical stiffness. Thus the resonance frequency of a tuned vibrating system is reduced by the magnetic flux of the driving system. The magnitude of this negative stiffness is proportional to the square of the gap flux. By causing the gap flux to change with temperature, the resonance frequency of the vibrating system can likewise be made to increase or decrease with temperature, whichever is needed to compensate for frequency changes that would be caused by inequality between the expansion and thermoelastic coefficients as discussed above.

It can be shown that the frequency change $\Delta f_r$ due to a temperature change from $T_1$ to $T_2$ in a reed of frequency $f$ is related to the expansion coefficient $\alpha$ and the modulus coefficient $\beta$ of the reed material by the following equation:

$$\Delta f_r = \frac{f(\alpha+\beta)(T_2-T_1)}{2} \quad (1)$$

It can further be shown that if the reed is driven electromagnetically through a variable gap with polarizing magnetic flux $\phi$, the frequency change $\Delta f$ is related to the temperature coefficient $m$ of the magnetic flux as follows:

$$\Delta f_\phi = \frac{fS_m(T_2-T_1)m}{S} \quad (2)$$

where $S_m$=the effective magnetic gap stiffness,
$S$=the effective stiffness of the reed at the center of the gap, $$m=\frac{\Delta\phi}{\phi(T_2-T_1)}.$$

If the frequency change due to the flux change is made equal to the frequency change due to the reed material and opposite in direction, then $$\Delta f_r = -\Delta f_\phi$$

so that from Equations 1 and 2

$$\frac{f(\alpha+\beta)(T_2-T_1)}{2} =$$

$$-\frac{f(S_m)(T_2-T_1)m}{S} \quad m=-\frac{(\alpha+\beta)S}{2S_m}$$
$$(3)$$

To make the flux vary in the proper manner with temperature and thereby realize the best relationship between $\alpha$, $\beta$, and $m$ as given by Equation 3, use can be made of nickel-iron alloys known as compensator alloys. These compensator alloys are composed of about 31 per cent nickel and the remainder pure iron and have a flux carrying capacity that decreases with rising temperature.

Figure 3:
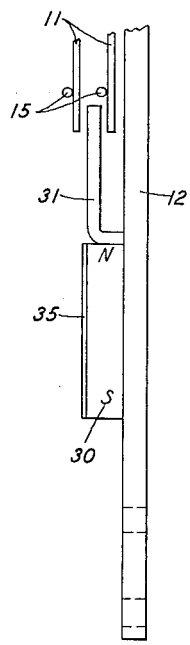
Fig. 3 is a side view similar to that of Fig. 2 showing the shunt compensator of Fig. 1.

Referring now to Figs. 1 and 3, the shunt type of compensator is shown incorporated in an electromagnetically driven tuning fork consisting of two tines 11 brazed to a base block 10 which in turn is fastened to a support frame 12 by screws 13 and spacer blocks 14.

Tuning bars 15 are secured to the tines 11, as by welding, and the resonance frequency adjusted by bending the ends of the bars either towards or away from the tine ends. One of the bars 15 also serves as one contact of a switch when the unit is employed as a selector, the other contact being a spring wire 16 which is secured to a strip 17 of conducting material. The strip 17 in turn is molded in spaced relationship to the beam 19 in the insulating block 20. Screws 13 and 21 secure beam 19 to support frame 12 which is attached to the base plug 22 and inserted in a thin metal cylindrical enclosure 23 to complete the structure.

An electrical path is formed through the switch from terminal 24 through lead 25 to strip 17 and spring wire 16, thence to bar 15, tine 11, base block 10, the other tine 11, spacer block 14, frame 12, lead 26 and terminal 27.

Attached to the frame is a permanent magnet 30 with an L-shaped pole-piece 31 of iron or Permalloy inserted between the open ends of the fork tines. This magnet sets up a permanent biasing flux which traverses the path from one pole to the pole-piece 31 across the gap to the tines 11 and returns through the air to the other pole of the magnet. Outside the enclosure 23 is a coil 33 through which is passed a current containing components of the same frequency as that of the fork and which causes the fork to vibrate by modulating the polarizing flux between the pole-piece 31 and the tines 11. The pulsating flux induced by the coil 33 is axial of the casing 23 and flows through the same magnetic circuit as the permanent magnet flux thus either aiding or opposing that flux depending upon the direction of current flow in the coil to either draw the tines toward the pole-piece 31 or permit them to move away from it respectively.

The tines in this case are an alloy of about 45 per cent nickel, 2 per cent titanium and the balance iron, which has an adequate and uniform permeability over a wide range of room temperatures and a positive thermoelastic coefficient. This positive thermoelastic coefficient would cause the resonance frequency of the fork to increase with rising temperature if it were plucked mechanically without the magnet and pole-piece in place or with a constant flux in the gap. To avoid this undesirable rise in frequency with temperature, a strip of compensator alloy 35 is placed along one side of the permanent magnet. At low temperatures, this compensator member reduces the flux in the gap by shunting the magnetomotive force of the magnet. As the temperature rises the flux carrying capacity of the compensator alloy drops, shunts the magnet to a lesser degree, and thereby causes the flux in the gap to increase. This gap flux increase causes the fork frequency to tend to drop. The flux effect on frequency is made equal to the thermoelastic effect so that the fork resonance frequency will not vary with ambient temperature.

Figure 2:
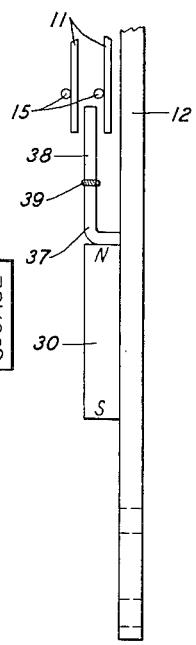
Fig. 2 is a side view of the permanent magnet assembly and reed tines with certain constructional details omitted to show a series magnetic compensator.

Another embodiment of this invention is shown in Fig. 2. This structure is similar to that in Fig. 1 except that the tines 11 are of iron or an iron alloy with a negative thermoelastic coefficient and the compensator 37 is inserted in series in the magnetic circuit between the magnet and the pole-piece 38 instead of in shunt with the magnet, and secured in that position by some means such as a solder joint 39. In this position, the compensator alloy causes the flux in the gap to decrease with rising temperature and thereby tends to raise the resonance frequency to compensate a tendency for a drop in frequency due to the negative thermoelastic coefficient of the tine material.

A third condition which can be corrected in accordance with this invention will arise in devices of the type considered here when the thermoelastic and the expansion coefficients of the tine material are equal in magnitude and opposite in sign. Under such conditions, a constant resonance frequency requires that the gap flux should be constant with temperature. This requires that the permeability and coercive force of all parts of the magnetic circuit remain constant with temperature over the desired working temperature range. Thus, as illustrated heretofore if the over-all magnetic system is such that its flux carrying capacity decreases with rising temperature, then a shunt of the type shown in Figs. 1 and 3 can be used to compensate this tendency, while the reverse condition can be corrected by the use of the series compensator of Fig. 2.

While a particular compensator alloy which is worked in its saturation range to obtain a convenient means of accurate control and which has a decreasing flux carrying capacity with increasing temperature, i. e., a negative temperature coefficient of magnetic saturation, is suggested for the preferred embodiments of this invention, it is to be understood that other compensator materials may be employed. For example, a material may be worked below saturation and its change in reluctance with temperature, either positive or negative, employed; or a material having a positive temperature coefficient of magnetic saturation density could be used, a material with positive temperature characteristics being used in series where shunt compensators are disclosed above and vice versa.

What is claimed is:

1. An electromechanical vibrator comprising a clamped vibrating member of magnetic material having a resonant frequency subject to variation with temperature changes, means including said vibrating member defining a magnetic circuit, said magnetic circuit having an air gap at the free end of said vibrating member, a signal coil in electromagnetic coupling relation with said circuit, and means for maintaining the resonant frequency of said vibrating member substantially constant comprising a magnetic member in said circuit having a flux carrying capacity which changes with temperature to change the gap flux density an amount sufficient to compensate for changes in the mechanical properties of said vibrating member with temperature tending to change its resonant frequency.

2. An electromechanical vibrator comprising a clamped vibrating member of magnetic material having a resonant frequency subject to variation with temperature changes, means including said vibrating member defining a magnetic circuit, said means including a polarizing magnet, a magnetic member positioned adjacent the free end of said vibrating member and defining an air gap therewith, a signal coil in electromagnetic coupling relation with said circuit, and means for maintaining the resonant frequency of said vibrating member substantially constant comprising a magnetic member in said circuit having a flux carrying capacity which changes with temperature to change the gap flux density an amount sufficient to compensate for changes in the mechanical properties of said vibrating member with temperature tending to change its resonant frequency.

3. A magnetic drive for a vibrating member having a resonance frequency, comprising a magnetic circuit having a gap, a portion of said vibrating member being located in said magnetic circuit gap, a polarizing magnet in said magnetic circuit, a conductor of magnetic flux having a flux carrying capacity which varies with temperature shunting said polarizing magnet to change the gap flux density with temperature an amount sufficient to compensate for changes in the resonance frequency of the vibrating member resulting from changes in its mechanical properties with changes in temperature, and magnetic driving means associated with said circuit.

4. An electromechanical vibrator comprising a clamped vibrating member of magnetic material having a resonant frequency subject to variation with temperature changes, means including said vibrating member defining a magnetic circuit, said magnetic circuit having an air gap at the free end of said clamped vibrating member, a signal coil in electromagnetic coupling relation with said circuit, and means serially related with said magnetic circuit for maintaining the resonant frequency of said vibrating member substantially constant comprising a magnetic member in said circuit having a flux carrying capacity which changes with temperature to change the gap flux density an amount sufficient to compensate for changes in the mechanical properties of said vibrating member with temperature tending to change its resonant frequency.

5. A magnetic drive for a tuning fork comprising a permanent magnet, a pole-piece on said magnet extending between the tines of said fork, means for modulating the flux in the gap between the tines and said pole-piece, and a shunt between the poles of said magnet having a flux carrying capacity which varies with temperature to change the gap flux density with temperature an amount sufficient to compensate for changes in the resonance frequency of the fork resulting from changes in its mechanical properties with changes in temperature.

6. An electromechanical vibrator comprising a tuning fork having a pair of tines of magnetic material, said tines having a resonant frequency subject to variation with temperature changes, means including said tines defining a magnetic circuit, said means including a polarizing magnet, a magnetic member extending between said tines and defining air gaps therewith, a signal coil in electromagnetic coupling relation with said circuit, and means serially related with said magnetic circuit for maintaining the resonant frequency of said tines substantially constant comprising a magnetic member in said circuit having a flux carrying capacity which changes with temperature to change the gap flux density an amount sufficient to compensate for changes in the mechanical properties of said tines with temperature tending to change their resonant frequency.

7. A magnetic drive for a tuning fork comprising a permanent magnet, a pole-piece on said magnet extending between the tines of said fork, means for modulating the flux in the gap between the tines and said pole-piece, and a shunt between the poles of said magnet having a negative temperature coefficient of magnetic saturation to change the gap flux density with temperature an amount sufficient to compensate for changes in the resonance frequency of the fork resulting from changes in its mechanical properties with changes in temperature.

8. An electromechanical vibrator comprising a tuning fork having a pair of tines of magnetic material, said tines having a resonant frequency subject to variation with temperature changes, means including said tines defining a magnetic circuit, said means including a polarizing magnet and a magnetic member extending between said tines and defining air gaps therewith, a signal coil in electromagnetic coupling relation with said circuit, and means for maintaining the resonant frequency of said tines substantially constant comprising a magnetic member in said circuit having a flux carrying capacity which changes with temperature to change the gap flux density an amount sufficient to compensate for changes in the mechanical properties of said tines with temperature tending to change their resonant frequency.

9. An electromechanical vibrator in accordance with claim 8 wherein said magnetic material of said tines is composed essentially of about 45 per cent nickel, 2 per cent titanium and the balance iron and said magnetic member is composed essentially of about 31 per cent nickel and the balance iron and is positioned to shunt the flux path of said polarizing magnet.

EVA T. ASHWORTH.
*Administratrix of the Estate of Joseph A. Ashworth, Deceased.*
LEE G. BOSTWICK.

REFERENCES CITED

The following references are of record in the file of this patent:

UNITED STATES PATENTS

| Number | Name | Date |
|---|---|---|
| 1,440,879 | Lee | Jan. 2, 1923 |
| 1,608,872 | Wallis | Nov. 30, 1926 |
| 1,653,794 | Whitehorn | Dec. 27, 1927 |
| 2,471,594 | Weightman | May 31, 1949 |
| 2,486,394 | Eannarino | Nov. 1, 1949 |

FOREIGN PATENTS

| Number | Country | Date |
|---|---|---|
| 561,904 | France | Aug. 20, 1923 |
| 169,389 | Switzerland | Aug. 16, 1934 |